United States Patent
Du et al.

(10) Patent No.: US 10,257,502 B2
(45) Date of Patent: Apr. 9, 2019

(54) METHODS AND APPARATUS FOR CONTROLLING LIGHT FIELD CAPTURE

(71) Applicant: BEIJING ZHIGU TECH CO., LTD., Beijing (CN)

(72) Inventors: Lin Du, Beijing (CN); Liang Zhou, Beijing (CN)

(73) Assignee: Beijing Zhigu Tech Co., Ltd., Beijing (CN)

( * ) Notice: Subject to any disclaimer, the term of this patent is extended or adjusted under 35 U.S.C. 154(b) by 6 days.

(21) Appl. No.: 15/520,125

(22) PCT Filed: Sep. 10, 2015

(86) PCT No.: PCT/CN2015/089298
§ 371 (c)(1),
(2) Date: Apr. 19, 2017

(87) PCT Pub. No.: WO2016/065991
PCT Pub. Date: May 6, 2016

(65) Prior Publication Data
US 2017/0324950 A1    Nov. 9, 2017

(30) Foreign Application Priority Data
Oct. 27, 2014    (CN) .......................... 2014 1 0584615

(51) Int. Cl.
*G02B 3/00* (2006.01)
*H04N 5/225* (2006.01)
(Continued)

(52) U.S. Cl.
CPC ......... *H04N 13/296* (2018.05); *G02B 3/0006* (2013.01); *H04N 5/2254* (2013.01);
(Continued)

(58) Field of Classification Search
CPC ............. G02B 3/0006; H04N 13/0207; H04N 13/0296; H04N 13/207; H04N 13/296; H04N 5/23212
See application file for complete search history.

(56) References Cited

U.S. PATENT DOCUMENTS

| 4,572,616 A | 2/1986 | Kowel et al. |
| 2007/0211207 A1 | 9/2007 | Lo et al. |

(Continued)

FOREIGN PATENT DOCUMENTS

| CN | 103458162 A | 12/2013 |
| CN | 103888655 A | 6/2014 |
| CN | 104486537 A | 4/2015 |

OTHER PUBLICATIONS

International Search Report and Written Opinion for Application No. PCT/CN2015/089298, dated Dec. 17, 2015, 7 pages.
(Continued)

*Primary Examiner* — Amy R Hsu
(74) *Attorney, Agent, or Firm* — Sheppard Mullin Richter & Hampton LLP

(57) ABSTRACT

Embodiments of the present application disclose various methods and an apparatus for controlling light field capture. One method for controlling light field capture comprises: determining, at least according to at least one sub-lens that affects imaging of a first region in a sub-lens array of a light field camera, at least one first sub-lens to be adjusted, the first region being a part of a scene to be shot; determining an object refocusing accuracy of a light field image section captured by the first sub-lens in a light field image of the scene to be shot; adjusting, according to the object refocusing accuracy, a light field capture parameter of the first sub-lens; and performing, based on the light field camera after being adjusted, light field capture on the scene to be shot. The solution can achieve differentiated distribution of
(Continued)

refocusing accuracies of various light field image sections that correspond to different regions of the scene to be shot, thereby better satisfying a user's actual application demands.

32 Claims, 6 Drawing Sheets

(51) Int. Cl.
| | |
|---|---|
| H04N 5/232 | (2006.01) |
| H04N 5/238 | (2006.01) |
| H04N 13/207 | (2018.01) |
| H04N 13/232 | (2018.01) |
| H04N 13/296 | (2018.01) |

(52) U.S. Cl.
CPC ......... H04N 5/238 (2013.01); H04N 5/23212 (2013.01); H04N 13/207 (2018.05); H04N 13/232 (2018.05)

(56) References Cited

U.S. PATENT DOCUMENTS

| | | | |
|---|---|---|---|
| 2011/0081042 A1* | 4/2011 | Kim | H04N 13/128 382/100 |
| 2011/0129165 A1 | 6/2011 | Lim et al. | |
| 2012/0300097 A1* | 11/2012 | Ng | G02B 3/0056 348/222.1 |
| 2013/0076966 A1* | 3/2013 | Border | H04N 5/2254 348/345 |
| 2013/0320195 A1 | 12/2013 | Wang et al. | |
| 2013/0329068 A1* | 12/2013 | Hamanaka | H04N 5/23293 348/218.1 |
| 2013/0329120 A1* | 12/2013 | Hiasa | H04N 5/23212 348/345 |
| 2014/0168371 A1* | 6/2014 | Chang | H04N 13/0232 348/46 |

OTHER PUBLICATIONS

Jeong, K. et al., "Tunable microdoublet lens array," Optics Express, 2004, vol. 12, Issue 11, p. 2494-2500.

* cited by examiner

METHODS AND APPARATUS FOR CONTROLLING LIGHT FIELD CAPTURE

CROSS-REFERENCE TO RELATED APPLICATIONS

This application is a National Phase Application of International Application No. PCT/CN2015/089298, filed on Sep. 10, 2015, which claims the benefit of priority to Chinese Patent Application No. 201410584615.3, filed on Oct. 27, 2014, and entitled "Methods and Apparatus for Controlling Light Field Capture", each of which is incorporated in the present application by reference herein in its entirety.

TECHNICAL FIELD

The present application relates to the technical field of light field capture, and in particular, to various methods and apparatus for controlling light field capture.

BACKGROUND

A light field camera relates to an imaging technology that can be used for recording and reproducing a three-dimensional scene by using a sub-lens array. Generally, a sub-lens array is arranged between a main lens and an image sensor such as CCD, so as to record light field information of a three-dimensional scene in different directions by using the sub-lens array on a focusing plane of the sub-lens array.

Different from a two-dimensional image capture manner of a traditional camera, a light field camera can record four-dimensional light field information (such as space and views) of a three-dimensional scene through a single exposure, and support "shooting first and focusing later" (that is, focusing needs not to be performed during shooting). A specific range of a light field image after being shot around a focusing plane during shooting is referred to as a depth range of refocusing point adjustment of the light field image. The depth range of refocusing point adjustment of a light field camera may be captured in advance through calculation according to characteristics and relative positions of elements of the light field camera.

Within the depth range of refocusing point adjustment, a new refocusing point may be determined at a depth interval of a certain step size, so as to acquire a refocused image based on the refocusing point from the light field image. A refocusing accuracy may also be referred to as a refocusing spatial depth resolution, which represents the size of a step value of an interval between two adjacent refocusing points within the depth range of refocusing point adjustment. If the refocusing accuracy is greater, a new refocusing point may be acquired at an interval of a smaller step size within the depth range of refocusing point adjustment; otherwise, if the refocusing accuracy is smaller, a new refocusing point may be acquired at an interval of a greater step size within the depth range of refocusing point adjustment.

SUMMARY

The following briefly describes the present application, so as to provide a basic understanding of some aspects of the present application. It should be understood that, the brief description is not an exhaustive brief description of the present application. The description is neither intended to determine key or important parts of the present application, nor intended to limit the scope of the present application. An objective thereof is merely to give some concepts in a simplified manner as a preface for more detailed description hereinafter.

The present application provides a method and an apparatus for controlling light field capture.

In one aspect, an embodiment of the present application provides a method for controlling light field capture, comprising:

determining, according to at least one sub-lens that affects imaging of a first region in a sub-lens array of a light field camera, at least one first sub-lens to be adjusted, the first region being a part of a scene to be shot;

determining an object refocusing accuracy of a light field image section captured by the first sub-lens in a light field image of the scene to be shot;

adjusting, according to the object refocusing accuracy, a light field capture parameter of the first sub-lens; and performing, based on the light field camera after being adjusted, light field capture on the scene to be shot.

In another aspect, an embodiment of the present application further provides an apparatus for controlling light field capture, comprising:

a first sub-lens determining module, configured to determine, according to at least one sub-lens that affects imaging of a first region in a sub-lens array of a light field camera, at least one first sub-lens to be adjusted, the first region being a part of a scene to be shot;

an object refocusing accuracy determining module, configured to determine an object refocusing accuracy of a light field image section captured by the first sub-lens in a light field image of the scene to be shot;

a first sub-lens adjustment module, configured to adjust, according to the object refocusing accuracy, a light field capture parameter of the first sub-lens; and a light field capture module, configured to perform, based on the light field camera after being adjusted, light field capture on the scene to be shot.

When the technical solution provided by the embodiments of the present application is adopted, an object refocusing accuracy of a light field image section that corresponds to a first region of a scene to be shot may be determined; then a light field capture parameter of a first sub-lens that affects at least partial imaging of a first region of the scene to be shot, is adjusted according to the object refocusing accuracy; and light field capture on the scene to be shot is performed based on the light field camera after being adjusted. In this way, refocusing accuracies of various light field image sections that correspond to different regions of the scene to be shot exhibit differentiated distribution. Compared with another part of the scene to be shot, a refocusing accuracy of a light field image section that corresponds to the first region of the scene to be shot varies from a default refocusing accuracy. An actual refocusing accuracy of a light field image section that corresponds to the first region is close or equal to the object refocusing accuracy as far as possible, so as to achieve differentiated distribution of refocusing accuracies of various light field image sections that correspond to different regions of the scene to be shot, thereby better satisfying a user's actual application demands.

The following describes in detail alternative embodiments of the present application with reference to accompanying drawings, to make these and other advantages of the present application more obvious.

BRIEF DESCRIPTION OF THE DRAWINGS

The present application may be understood better with reference to the following description in combination with accompanying drawings, wherein a same or similar accompanying drawing mark is used in all the accompanying drawings to represent a same or similar component. The accompanying drawings together with the following detailed description are comprised in the specification and constitute a part of the specification, and are used to further illustrate alternative embodiments of the present application and explain the principle and advantages of the present application. In the accompanying drawings.

Figure 1:
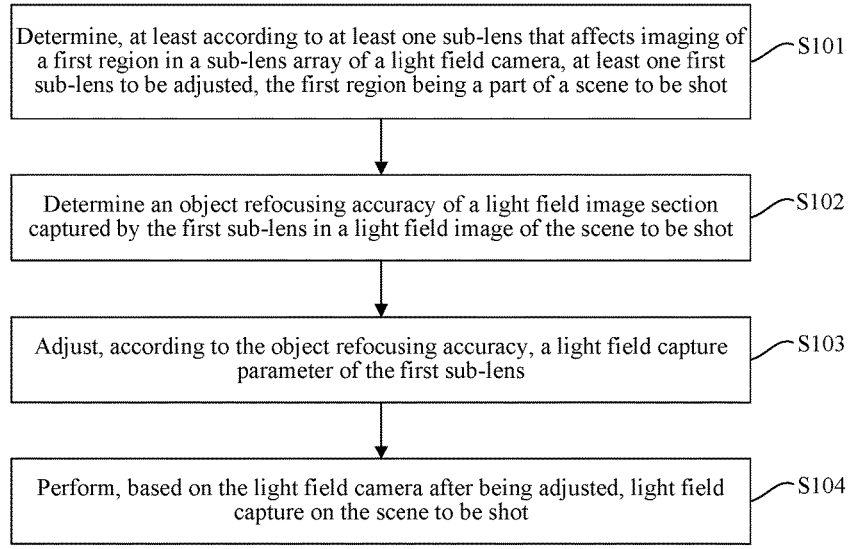
FIG. 1 is a flowchart of a method for controlling light field capture according to an embodiment of the present application.

A person skilled in the art should understand that, elements in the accompanying drawings are merely shown for simplicity and clarity, and are not necessarily drawn to scale. For example, in the accompanying drawings, the size of an element may be enlarged relative to another element, so as to facilitate enhancing an understanding of the embodiments of the present application.

DETAILED DESCRIPTION

The following will describe in details illustrative embodiments of the present application with reference to accompanying drawings. For the purpose of clear and brief description, the specification does not describe all features of practical implementation manners. However, it should be understood that, many decisions specific to the implementation manners must be made during development of any one of the practical embodiments, so as to achieve a specific objective of a developer, for example, conformance to restrictive conditions related with a system and service, wherein the restrictive conditions may vary with different implementation manners. In addition, it should also be understood that, although development work may be very complex and time-consuming, for a person skilled in the art that benefits from the content of the present disclosure, the development work is only a routine task.

Another point that should be noted here is, to avoid the present application from being not clearly understood due to unnecessary details, the accompanying drawings and specification merely describe apparatus structures and/or processing steps closely related to the solutions of the present application, but omit the representation and description of parts and processing that have little relation with the present application, and have been known by a person of ordinary skill in the art.

The following further describes in detail specific implementation manners of the present application with reference to the accompanying drawings (a same label represents a same element in several accompanying drawings) and embodiments. The following embodiments are used to describe the present application, but are not intended to limit the scope of the present application.

A person skilled in the art may understand that, terms such as "first" and "second" in the present application are merely used to distinguish different steps, devices or modules, which neither represent any specific technical meaning, nor represent a necessary logic sequence among them.

During implementation of the embodiments of the present application, the inventor of the present application found that, when light field capture on a scene to be shot is performed based on a light field camera, for different zones of the scene to be shot, light field capture may be performed through different sub-lenses in a sub-lens array of the light field camera, and the entirety of light field image sections separately captured by various sub-lenses is a light field image of the scene to be shot. For a light field image captured by the light field camera, a depth range of refocusing point adjustment for the light field image is generally a specific range around a focusing plane during light field capture, and a refocusing accuracy is generally a constant (which may be referred to as a default refocusing accuracy), both of which can be captured in advance. That is, refocusing accuracies of various light field image sections captured by different sub-lenses of the light field camera in a light field image of the scene to be shot are all identical, which means that refocusing accuracies of various light field image sections that correspond to different zones of the scene to be shot are all identical. However, in some cases, different zones of a scene to be shot generally have different meanings and/or importance for a user, that is, a user's requirements for refocusing accuracies of light field image sections that correspond to different zones of a scene to be shot are different. For example, in a scenario of taking a photo of a person, a user is more interested in the person's face than scenery in the scenario, and therefore, a requirement for a refocusing accuracy of a light field image section of a person's face is higher; and the forth. For this purpose, an embodiment of the present application provides a method for controlling light field capture, which can perform differentiated adjustment on refocusing accuracies for light field image sections of different zones of a scene to be shot, thereby better satisfying a user's diversified actual application demands. The following further describes the technical solution with reference to the accompanying drawings.

FIG. 1 is a flowchart of a method for controlling light field capture according to this embodiment of the present application. The method for controlling light field capture provided by this embodiment of the present application may be executed by an apparatus for controlling light field capture, wherein the apparatus for controlling light field capture can perform static or dynamic light field capture control by using the method for controlling light field capture during an application procedure, comprising but not limited to: photo taking, camera shooting, photographing, and video monitoring. There is no limit to the manners in which the apparatus for controlling light field capture is embodied. For example, the apparatus for controlling light field capture may be an independent component, the component cooperating with a light field camera in communications; or the apparatus for controlling light field capture may be integrated as a functional module into an image capture device comprising a light field camera, which is not limited in this embodiment of the present application.

Specifically, as shown in FIG. 1, a method for controlling light field capture provided by this embodiment of the present application comprises:

S101: Determine, according to at least one sub-lens that affects imaging of a first region in a sub-lens array of a light field camera, at least one first sub-lens to be adjusted, the first region being a part of a scene to be shot.

The light field camera generally comprises a main lens, a sub-lens array and an image sensor that are successively arranged. The sub-lens array comprises a plurality of sub-lenses distributed in an array form. The scene to be shot is a three-dimensional scene. Rays of light from different objects in the scene to be shot in different directions are focused through a main lens to at least one sub-lens in the sub-lens array. The rays of light focused through the main lens are separated through the at least one sub-lens. For the separated rays of light, information on light intensities and directions is recorded by the image sensor, so as to acquire imaging information (namely, light field information) of the scene to be shot in multiple views and directions. The captured light field information may be reflected as superimposing of multiple parallax images that are alternately arranged, which may be referred to as a light field image.

Under a circumstance that light field capture on a scene to be shot is performed based on a light field camera, sub-lenses that affect imaging of different zones of the scene to be shot may be different. In the present application, at least one sub-lens that affects imaging of the first zone in a sub-lens array of a light field camera is determined, and some or all of sub-lenses among the determined at least one sub-lens are determined as a first sub-lens to be adjusted. That is, among all sub-lenses that affect imaging of the first zone, some or all of the sub-lenses may need to be adjusted, which is specifically determined according to actual demands.

S102: Determine an object refocusing accuracy of a light field image section captured by the first sub-lens in a light field image of the scene to be shot.

An object refocusing accuracy of a light field image section captured by the first sub-lens is generally used for characterizing a relative expectancy of a user or a device for a refocusing accuracy of a light field image section that corresponds to at least a part of the first region within a range of refocusing depth adjustment. In practical application, the object refocusing accuracy may be flexibly determined according to a requirement of a user or a device for a refocusing accuracy of the first zone. The determined object refocusing accuracy is different from a default refocusing accuracy. For example, the object refocusing accuracy is greater than the default refocusing accuracy, or the object refocusing accuracy is less than the default refocusing accuracy. S103: Adjust, according to the object refocusing accuracy, a light field capture parameter of the first sub-lens.

During implementation of this embodiment of the present application, the inventor of the present application found that, adjustment on an optical capture parameter (such as a focal length of a sub-lens, and a distance between a sub-lens and an image sensor) of each sub-lens in a sub-lens array may have an impact on a refocusing accuracy of a light field image section captured by each sub-lens. Specifically, during light field capture by a light field camera through focusing, there is a certain correspondence between a refocusing accuracy of a light field image section captured by each sub-lens and the quantity of pixel points comprised in an imaging zone of the image sensor that corresponds to each sub-lens. If the quantity of pixel points comprised in an imaging zone of the image sensor that corresponds to a sub-lens is larger, the refocusing accuracy of a light field image section captured by the sub-lens is greater; and vice versa. Adjustment on an optical capture parameter of a sub-lens may change an imaging area of the image sensor that corresponds to the sub-lens. If an imaging zone of the image sensor that corresponds to the sub-lens is enlarged (namely, the imaging area is increased), then the quantity of pixel points of the image sensor that correspond to the sub-lens is also increased. In this way, a refocusing accuracy of a light field image section captured by the sub-lens may be improved during light field capture. On the contrary, if an imaging zone of the image sensor that corresponds to the sub-lens is narrowed (namely, the imaging area is reduced), then the quantity of pixel points of the image sensor that correspond to the sub-lens is also reduced. In this way, a refocusing accuracy of a light field image section captured by the sub-lens may be reduced during light field capture.

In practical applications, according to this embodiment of the present application, an object imaging area of the image sensor that corresponds to the first sub-lens may be determined according to an object refocusing accuracy of a light field image section captured by the first sub-lens; and a light field capture parameter of the first sub-lens is adjusted according to the object imaging area, to cause an actual imaging area of the image sensor that corresponds to the first sub-lens after being adjusted to be close or equal to the object imaging area as far as possible, thereby causing an actual refocusing accuracy of a light field image section captured by the first sub-lens to be close or equal to the object refocusing accuracy as far as possible.

S104: Perform, based on the light field camera after being adjusted, light field capture on the scene to be shot.

After the first sub-lens is adjusted by the light field camera, imaging areas of the image sensor that correspond to different sub-lenses in the sub-lens array are different. For example, after a light field capture parameter of the first sub-lens is adjusted according to the object refocusing accuracy, an imaging area of the image sensor that corresponds to the first sub-lens is larger than an imaging area of the image sensor that corresponds to a sub-lens other than the first sub-lens in the sub-lens array. In this case, the imaging area of the image sensor that corresponds to the first sub-lens is larger and the quantity of corresponding pixel points is greater. As the first sub-lens is a sub-lens that affects imaging of the first zone, during light field capture on the scene to be shot based on a light field camera after being adjusted, more pixel points on the image sensor are used for acquiring light field information of the first zone, thereby improving a refocusing accuracy of a light field image section that corresponds to the first zone.

It can be seen that, when the technical solution provided by this embodiment of the present application is adopted, refocusing accuracies of various light field image sections that correspond to different regions of the scene to be shot exhibit differentiated distribution. Compared with another part of the scene to be shot, a refocusing accuracy of a light field image section that corresponds to the first region of the scene to be shot varies from a default refocusing accuracy. An actual refocusing accuracy of a light field image section that corresponds to the first region is close or equal to the object refocusing accuracy as far as possible, so as to achieve differentiated distribution of refocusing accuracies of various light field image sections that correspond to different regions of the scene to be shot, thereby better satisfying a user's actual application demands.

In the technical solution provided by this embodiment of the present application, the manner of determining an object refocusing accuracy is very flexible, which is not limited in this embodiment of the present application. For example, a default refocusing accuracy of a light field image section captured by the first sub-lens may be determined, and an object refocusing accuracy is determined according to the default refocusing accuracy, wherein the object refocusing accuracy is greater than the default refocusing accuracy.

Figure 2:
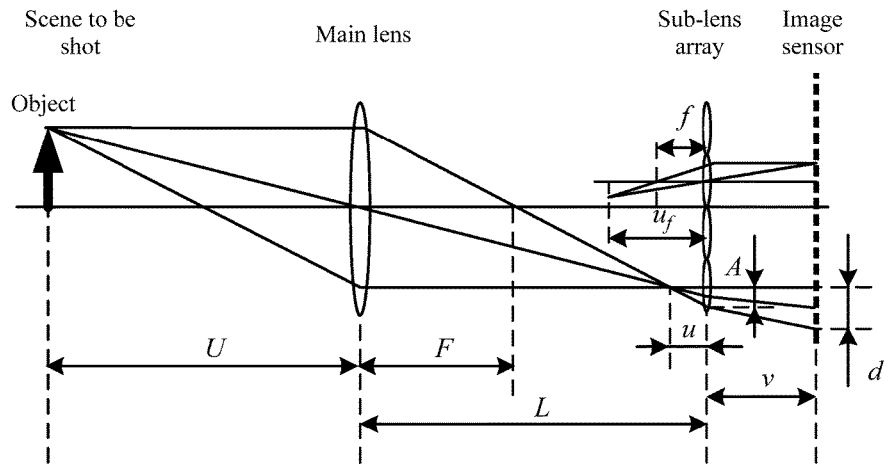
FIG. 2 is a schematic structural diagram of an optional light path of a light field camera according to an embodiment of the present application.

The default refocusing accuracy may be acquired in advance, or acquired through calculation according to optical properties of a light field camera, which is not limited in this embodiment of the present application. According to classical theories of geometrical optics, an optical path diagram of a light field camera may be equivalent to imaging, by a sub-lens, of a real image or a virtual image formed by a main lens, on an imaging sub-region that corresponds to the sub-lens, as shown in FIG. 2. Therefore, pixels located in different imaging positions of an image sensor may store object information at different depths of a scene to be shot. An image of an object in a partial zone (such as the first zone) of the scene to be shot is formed in a certain imaging zone of the image sensor through at least one sub-lens in a sub-lens array. Information on different depths of the first zone is recorded in pixel points of the imaging zone, so as to obtain a light field image section that corresponds to the first zone.

For light field information captured by a sub-lens about objects at different depths of a scene to be shot, images are formed in imaging zones of an image sensor within different radiuses of circles of confusion. The radius of a circle of confusion may be calculated by using the following formula:

$$d = \frac{Afu_f}{u_f - f}\left(\frac{1}{u_f} - \frac{1}{u}\right) \quad (1)$$

wherein: d represents a radius of a circle of confusion, which is equal to a distance between a pixel point in an imaging zone of the image sensor that corresponds to the sub-lens and an optical axis of the sub-lens; A is a radius of the sub-lens; f is a focal length of the sub-lens; $u_f$ represents a distance between a focusing plane of the sub-lens and a center of the sub-lens; and u represents a distance between a real image or a virtual image of an object in a scene to be shot that is formed through a main lens and a center of the sub-lens (for a real image: u is a positive value; and for a virtual image, u is a negative value).

An imaging formula of a main lens is as follows:

$$\frac{1}{F} = \frac{1}{U} + \frac{1}{V} = \frac{1}{U} + \frac{1}{L-u} \quad (2)$$

wherein: F represents a focal length of a main lens; U represents an object distance between an object in a scene to be shot and the main lens; and L represents a distance between an optical center of the main lens and an optical center of a sub-lens.

An imaging formula of a sub-lens is as follows:

$$\frac{1}{f} = \frac{1}{u_f} + \frac{1}{v} \quad (3)$$

wherein: v represents a distance between a sub-lens and an image sensor.

By combining formula (1), formula (2) and formula (3), it can be obtained as follows:

$$d = \frac{Afu_f}{u_f - f}\left(\frac{1}{u_f} - \frac{1}{u}\right) = Av\left(\frac{1}{f} - \frac{1}{u}\right) - A \quad (4)$$

A maximum imaging area of the image sensor that corresponds to a sub-lens (such as the first sub-lens) may be characterized by using a maximum radius of a circle of confusion, that is:

$$d_{max} = Av\left(\frac{1}{f} - \frac{1}{u_{max}}\right) - A = A - Av\left(\frac{1}{f} - \frac{1}{u_{min}}\right) \quad (5)$$

wherein: $d_{max}$ represents a maximum radius of a circle of confusion, which is equal to a maximum value among distances between positions of pixel points in an imaging zone of the image sensor that corresponds to a sub-lens and an optical axis of the sub-lens; A is a radius of the sub-lens; f is a focal length of the sub-lens; and u represents a distance between a real image or a virtual image of an object in a scene to be shot that is formed through a main lens and a center of the sub-lens (for a real image, u is a positive value; and for a virtual image, u is a negative value), wherein $u_{max}$ is a distance between a real image or a virtual image formed through a main lens of an object in a scene to be shot that has a maximum object distance $u_{max}$ relative to the main lens within a depth range of refocusing point adjustment and a center of the sub-lens; and $u_{min}$ is a distance between a real image or a virtual image formed through a main lens of an object in a scene to be shot that has a minimum object distance $U_{min}$ relative to the main lens within a depth range of refocusing point adjustment and a center of the sub-lens. An object distance U of an object in a scene to be shot relative to a main lens, and a distance u between a real image or a virtual image of the object formed through a main lens and a center of the sub-lens, are in accordance with the following formula:

$$\begin{cases} \dfrac{1}{U_{max}} = \dfrac{1}{F} + \dfrac{1}{\dfrac{1}{\dfrac{1}{f} - \dfrac{1}{v}\left(1 + \dfrac{d_{max}}{A}\right)} - L} = \dfrac{1}{F} + \dfrac{1}{u_{max} - L} \\ \dfrac{1}{U_{min}} = \dfrac{1}{F} + \dfrac{1}{\dfrac{1}{\dfrac{1}{f} - \dfrac{1}{v}\left(1 - \dfrac{d_{max}}{A}\right)} - L} = \dfrac{1}{F} + \dfrac{1}{u_{min} - L} \end{cases} \quad (6)$$

wherein: F represents a focal length of a main lens; L represents a distance between an optical center of the main lens and an optical center of the sub-lens; and ($U_{min}$, $U_{max}$) represents a depth range of refocusing point adjustment of the light field camera. The depth range of refocusing point adjustment may be acquired in advance according to the existing technology. $u_{max}$ or $u_{min}$ may be calculated according to formula (6); then $d_{max}$ may be calculated according to formula (5). A refocusing accuracy that corresponds to $d_{max}$ is the default refocusing accuracy mentioned in this embodiment of the present application.

After the default refocusing accuracy is acquired, the object refocusing accuracy may be determined according to a requirement of a user or a device for a refocusing accuracy of a light field image section that corresponds to the first region. The determined object refocusing accuracy is different from the default refocusing accuracy. Optionally, the determined object refocusing accuracy is greater than the default refocusing accuracy. Under such a circumstance, an imaging area of the image sensor that corresponds to the object refocusing accuracy is greater than an imaging area of the image sensor that corresponds to the default refocusing accuracy. That is, a maximum radius $d_{max}'$ of a circle of confusion in an imaging zone of the image sensor that corresponds to the object refocusing accuracy is greater than a maximum radius $d_{max}$ of a circle of confusion in an imaging zone of the image sensor that corresponds to the default refocusing accuracy.

Optionally, a light field capture parameter of the first sub-lens comprises at least one of the following: a focal length f of the first sub-lens and a distance v between the first sub-lens and the image sensor. According to formula (5), it can be known that, after $d_{max}'$ is determined, f and/or v may be adjusted through the first sub-lens, to cause an actual maximum radium of a circle of confusion in an imaging zone of the image sensor that corresponds to the first sub-lens after being adjusted to be close or equal to $d_{max}'$ as far as possible, thereby causing a refocusing accuracy of a light field image section captured by the first sub-lens after being adjusted to be close or equal to the object refocusing accuracy as far as possible.

For example, the adjusting, according to the object refocusing accuracy, a focal length of the first sub-lens comprises: reducing, according to the object refocusing accuracy, a focal length of the first sub-lens. In the solution, an actual maximum radius of a circle of confusion in an imaging zone of the image sensor that corresponds to the first sub-lens may be increased by means of reducing a focal length of the first sub-lens, to cause an actual maximum radius of a circle of confusion in an imaging zone of the image sensor that corresponds to the first sub-lens after being adjusted to be close or equal to $d_{max}'$ as far as possible, thereby causing a refocusing accuracy of a light field image section captured by the first sub-lens after being adjusted to be close or equal to the object refocusing accuracy as far as possible.

For another example, the adjusting, according to the object refocusing accuracy, a distance between the first sub-lens and the image sensor comprises: increasing, according to the object refocusing accuracy, a distance between the first sub-lens and the image sensor. In the solution, an actual maximum radius of a circle of confusion in an imaging zone of the image sensor that corresponds to the first sub-lens may be increased by means of increasing a distance between the sub-lens and the image sensor, to cause an actual maximum radius of a circle of confusion in an imaging zone of the image sensor that corresponds to the first sub-lens after being adjusted to be close or equal to $d_{max}'$ as far as possible, thereby causing a refocusing accuracy of a light field image section captured by the first sub-lens after being adjusted to be close or equal to the object refocusing accuracy as far as possible.

For still another example, the adjusting, according to the object refocusing accuracy, a distance between the first sub-lens and the image sensor comprises: reducing, according to the object refocusing accuracy, a focal length of the first sub-lens, and increasing a distance between the first sub-lens and the image sensor. In the solution, an actual maximum radius of a circle of confusion in an imaging zone of the image sensor that corresponds to the first sub-lens may be increased by means of reducing a focal length of the first sub-lens and increasing a distance between the sub-lens and the image sensor, to cause an actual maximum radius of a circle of confusion in an imaging zone of the image sensor that corresponds to the first sub-lens after being adjusted to be close or equal to $d_{max}'$ as far as possible, thereby causing a refocusing accuracy of a light field image section captured by the first sub-lens after being adjusted to be close or equal to the object refocusing accuracy as far as possible.

In addition, it can be known by combining formula (5) and formula (6), an impact of adjusting f and/or v of the first sub-lens on a depth range ($U_{min}$, $U_{max}$) of refocusing point adjustment of the light field camera may be omitted theoretically, and a depth range ($U_{min}$, $U_{max}$) of refocusing point adjustment of the light field camera after being adjusted remains basically the same. In this way, various light field image sections captured by different sub-lenses in the sub-lens array have the same depth range of refocusing point adjustment, and the sub-lenses can acquire light field information with different richness degrees on different zones of the image to be shot within the depth range of refocusing point adjustment, so as to facilitate improving quality of a refocused image that is captured based on a light field image of the scene to be shot, under a circumstance that refocusing accuracies of different light field image sections captured by different sub-lenses are different.

On basis of the technical solution in any one of the foregoing embodiments of the present application, a light field capture parameter of at least one sub-lens other than sub-lenses that affect imaging of the first zone in the sub-lens array may also be adjusted as an assistance, to make full use of existing pixels of the image sensor, thereby achieving differentiated adjustment of refocusing accuracies of various light field image sections captured through different sub-lenses.

Optionally, before the performing, based on the light field camera after being adjusted, light field capture on the scene to be shot, the method further comprises: determining at least one second sub-lens to be adjusted, the second sub-lens being a sub-lens other than the at least one sub-lens in the sub-lens array; and adopting an adjustment manner that is reverse to a light field capture parameter of the first sub-lens, to adjust a light field capture parameter of the second sub-lens. The adjustment manner that is reverse to a light field capture parameter of the first sub-lens means that a tendency of adjusting a light field capture parameter of the second sub-lens is reverse to a tendency of adjusting a light field capture parameter of the first sub-lens, but corresponding adjustment amplitude may vary from each other.

Specifically, a light field capture parameter of the second sub-lens comprises at least one of the following: a focal length of the second sub-lens and a distance between the second sub-lens and the image sensor. In the solution, during adjustment of the second sub-lens, a depth range of refocusing point adjustment of the light field camera may remain the same as far as possible.

Figure 3A:
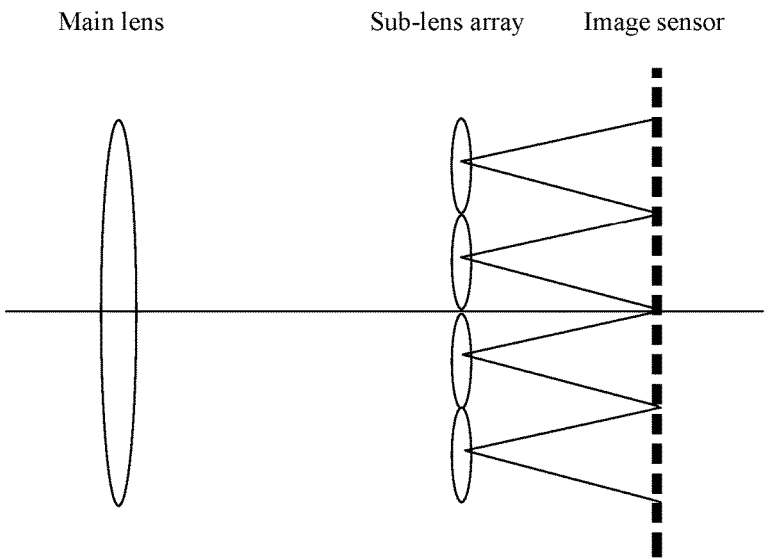
FIG. 3a is an optional example of a correspondence between each sub-lens of a light field camera before adjustment and an imaging zone of an image sensor according to an embodiment of the present application.
Figure 3B:
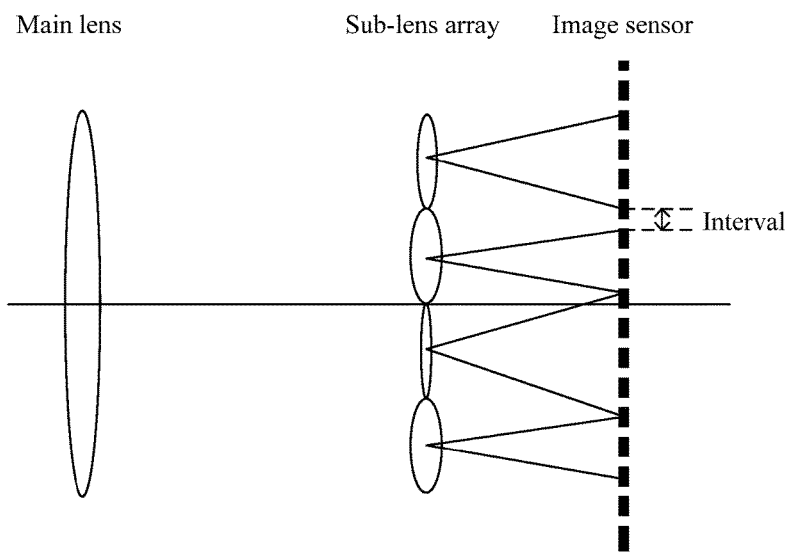
FIG. 3b is an optional example of a correspondence between a sub-lens of a light field camera after being adjusted and an imaging zone according to an embodiment of the present application.

An adjustment manner that is reverse to a light field capture parameter of the first sub-lens is adopted to adjust a light field capture parameter of the second sub-lens. For example, when a focal length of the first sub-lens is reduced, a focal length of the second sub-lens is increased. Before each sub-lens of the light field camera is adjusted, an optional example of a correspondence between each sub-lens and an imaging zone of the image sensor is shown in FIG. 3a, wherein imaging zones of the image sensor that correspond to various sub-lenses are identical. For a correspondence between a sub-lens of a light field camera after being adjusted and an imaging zone, an optional example is as shown in FIG. 3b. Supposing a third sub-lens arranged from top to bottom is the first sub-lens to be adjusted that affects light field capture of the first region, and an object refocusing accuracy of a light field image section captured by the first sub-lens is greater than a default refocusing accuracy, then a focal length of the first sub-lens is reduced according to the object refocusing accuracy, to cause an imaging area of the image sensor that corresponds to the first sub-lens after being adjusted to be increased. In this case, to reduce a probability of superimposing of imaging zones that respectively correspond to adjacent sub-lenses, a second sub-lens and a fourth sub-lens arranged from top to bottom are separately used as a second sub-lens to be adjusted, and a focal length of the second sub-lens is increased, thereby reducing an imaging area of the image sensor that corresponds to the second sub-lens after being adjusted. Here, as long as a tendency of adjusting a focal length of the first sub-lens is reverse to a tendency of adjusting a focal length of the second sub-lens, amplitude of focal length adjustment may be flexibly determined according to a possible actual superimposing degree of imaging zones. In the solution, a probability of superimposing of imaging zones of adjacent sub-lenses may be reduced, thereby improving overall quality of a light field image captured based on a light field camera after being adjusted.

Figure 3C:
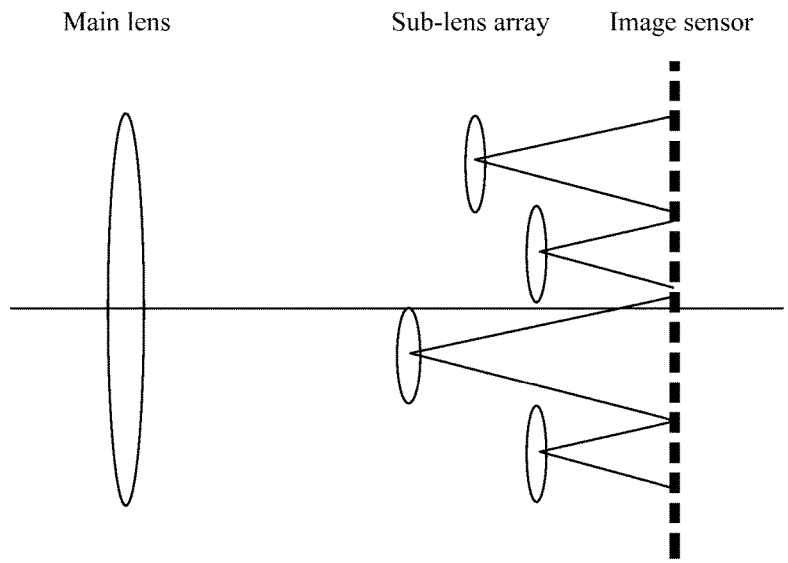
FIG. 3c is another optional example of a correspondence between a sub-lens of a light field camera after being adjusted and an imaging zone according to an embodiment of the present application.

An adjustment manner that is reverse to a light field capture parameter of the first sub-lens is adopted to adjust a light field capture parameter of the second sub-lens. For example, when a distance between the first sub-lens and the image sensor is increased, a distance between the second sub-lens and the image sensor is reduced. For a correspondence between a sub-lens of a light field camera after being adjusted and an imaging zone, another optional example is as shown in FIG. 3c. Supposing a third sub-lens arranged from top to bottom is the first sub-lens to be adjusted that affects light field capture of the first region, and an object refocusing accuracy of a light field image section captured by the first sub-lens is greater than a default refocusing accuracy, then a distance between the first sub-lens and the image sensor is increased according to the object refocusing accuracy, to cause an imaging area of the image sensor that corresponds to the first sub-lens after being adjusted to be increased. In this case, to reduce a probability of superimposing of imaging zones that respectively correspond to adjacent sub-lenses, a second sub-lens and a fourth sub-lens arranged from top to bottom are separately used as a second sub-lens to be adjusted, and a distance from the second sub-lens and the image sensor is reduced, thereby reducing an imaging area of the image sensor that corresponds to the second sub-lens after being adjusted. Here, as long as a tendency of adjusting a distance between the first sub-lens and the image sensor is reverse to a tendency of adjusting a distance between the second sub-lens and the image sensor, amplitude of distance adjustment may be flexibly determined according to a possible actual superimposing degree of imaging zones. In the solution, a probability of superimposing of imaging zones of adjacent sub-lenses may be reduced, thereby improving overall quality of a light field image captured based on a light field camera after being adjusted.

Under a circumstance that a focal length of the first sub-lens and a distance between the first sub-lens and the image sensor are both adjusted, an adjustment manner that is reverse to a light field capture parameter of the first sub-lens is also adopted, to correspondingly adjust a focal length of the second sub-lens and a distance between the second sub-lens and the image sensor, thereby reducing a probability of superimposing of imaging zones of adjacent sub-lenses, and improving overall quality of a light field image captured based on a light field camera after being adjusted. The details are not described herein again.

Figure 3D:
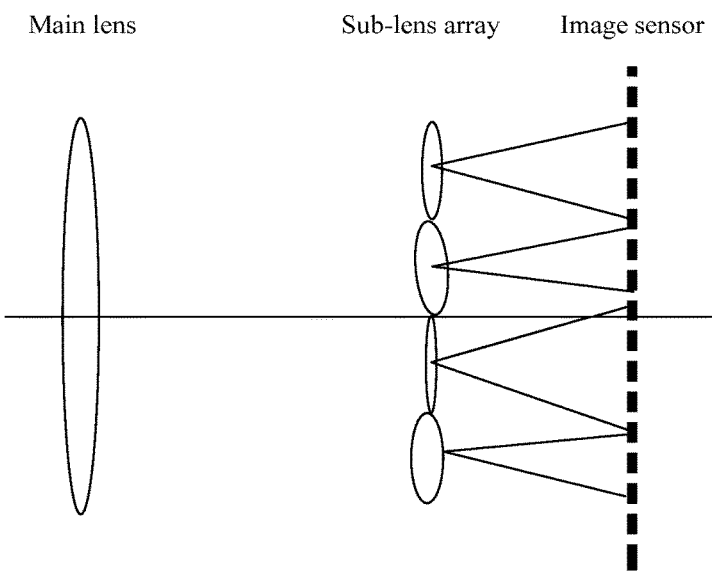
FIG. 3d is still another optional example of a correspondence between a sub-lens of a light field camera after being adjusted and an imaging zone according to an embodiment of the present application.

Further, before the performing, based on the light field camera after being adjusted, light field capture on the scene to be shot, the method further comprises adjusting the direction of an optical axis of the second sub-lens. For example, referring to FIG. 3b, after focal lengths of a second sub-lens, a third sub-lens and a fourth sub-lens arranged from top to bottom are adjusted, imaging zones of the image sensor that correspond to the three sub-lenses are changed. There may be a certain interval between imaging zones that respectively correspond to the first sub-lens and the second sub-lens, and light field capture cannot be performed by pixel points located within the interval. To improve the utilization rate of pixels of the image sensor during light field capture, a second sub-lens may be used as the second sub-lens mentioned herein to be adjusted. The direction of an optical axis of the second sub-lens is adjusted as shown in FIG. 3d, so as to move a center of an imaging zone that corresponds to the second sub-lens on the image sensor, thereby reducing an interval between imaging zones that respectively correspond to the adjusted second sub-lens and an adjacent sub-lens thereof.

In the technical solution provided by this embodiment of the present application, some or all of sub-lenses among the at least one sub-lens that affects imaging of the first region in a sub-lens array of a light field camera may be determined according to actual demands, as a first sub-lens to be adjusted. To improve accuracy of the first sub-lens determining, the at least one first sub-lens may be determined according to the at least one sub-lens, a depth range of refocusing point adjustment of a light field image that the light field camera is allowed to acquire, and depth information of the first region. Specifically, a superimposed depth range between depth information of the first region and the depth range of refocusing point adjustment may be determined; and one or more sub-lenses that affect imaging within the superimposed depth range among the at least one sub-lens are determined as the at least one first sub-lens. Optionally, a superimposed depth range between depth information of the first region and the depth range of refocusing point adjustment may be determined; and one or more sub-lenses that affect imaging within the superimposed depth range among the at least one sub-lens are determined as the at least one first sub-lens. In the solution, a sub-lens that affects light field capture for a part of the first region within the depth range of refocusing point adjustment may be adjusted, so as to improve a refocusing accuracy of a light field capture image section that corresponds to the first region.

Based on any one of the foregoing technical solutions, optionally, the method for controlling light field capture may further comprise: determining the first region. In the solution, a part (such as a region with a higher refocusing accuracy requirement) of a current scene to be shot may be determined in advance according to actual demands as the first region, thereby better satisfying personalized application demands of a subject such as a user or a device.

The manner of determining the first region is very flexible, which is not limited in this embodiment of the present application. For example, the light field camera generally comprises a viewfinder to display a preview image of a current scene to be shot from a view. In this embodiment of the present application, the first region may be determined based on the preview image, so as to improve convenience of use by a user.

The specific implementation manner of determining the first region based on the preview image is also very flexible.

For example, the first region may be determined according to information on a region of interest (ROI for short) of the preview image, that is, ROI determining information is acquired based on a preview image of the scene to be shot by the light field camera; and a region that corresponds to the ROI determining information in the scene to be shot is determined as the first region. The region of interest may comprise but is not limited to one or more of the following: at least one region of the preview image that is selected by a user (namely, a user's selection region of the preview image), at least one region of the preview image that is gazed by a user (namely, a user's gaze region of the preview image), and a region of interest of the preview image that is automatically detected by a light field capture device. In the solution, a corresponding part of the scene to be shot is determined as the first region according to the ROI of the preview image, to cause determining of the first region to be more consistent with a user's actual demands, thereby better satisfying a user's diversified application demands.

For still another example, the first region may be automatically determined according to a result of an image analysis for the preview image, that is, an image analysis is performed on a preview image of the scene to be shot by the light field camera; and the first region is determined according to a result of the image analysis. In an alternative scenario, face recognition is performed on the preview image, and a face region is determined as the first region according to a recognition result. In the solution, according to a result of an image analysis for the preview image, a corresponding region in a scene to be shot may be determined as the first region, to cause determining of the first region to be more intelligent, and improve efficiency and universality of the first region determining.

It may be understood by a person skilled in the art that, in any one of the foregoing methods of specific implementation manners of the present application, the value of the serial number of each step described above does not mean an execution sequence, and the execution sequence of the steps should be determined according to the function and internal logic thereof, and should not constitute any limitation to the implementation procedure of the specific implementation manners of the present application.

Figure 4:
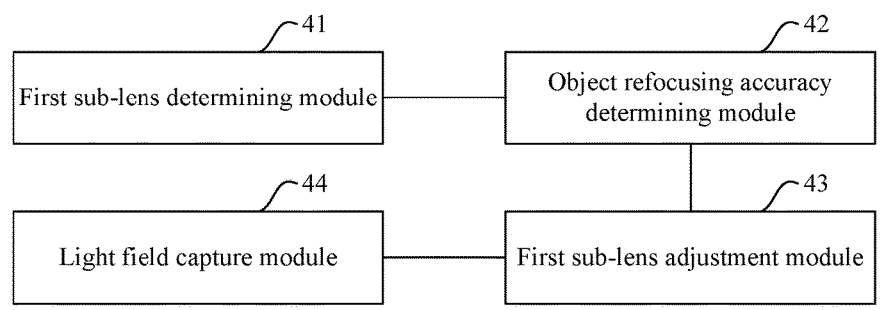
FIG. 4 is a logic block diagram of a first apparatus for controlling light field capture according to an embodiment of the present application.

FIG. 4 is a logic block diagram of an apparatus for controlling light field capture according to an embodiment of the present application. As shown in FIG. 4, the apparatus for controlling light field capture provided by this embodiment of the present application comprises: a first sub-lens determining module 41, an object refocusing accuracy determining module 42, a first sub-lens adjustment module 43, and a light field capture module 44.

The first sub-lens determining module 41 is configured to determine, according to at least one sub-lens that affects imaging of a first region in a sub-lens array of a light field camera, at least one first sub-lens to be adjusted, the first region being a part of a scene to be shot.

The object refocusing accuracy determining module 42 is configured to determine an object refocusing accuracy of a light field image section captured by the first sub-lens in a light field image of the scene to be shot.

The first sub-lens adjustment module 43 is configured to adjust, according to the object refocusing accuracy, a light field capture parameter of the first sub-lens.

The light field capture module 44 is configured to perform, based on the light field camera after being adjusted, light field capture on the scene to be shot.

When the technical solution provided by the embodiments of the present application is adopted, an object refocusing accuracy of a light field image section that corresponds to a first region of a scene to be shot may be determined; then a light field capture parameter of a first sub-lens that affects at least partial imaging of a first region of the scene to be shot is adjusted according to the object refocusing accuracy; and light field capture for the scene to be shot is performed based on the light field camera after being adjusted. In this way, refocusing accuracies of various light field image sections of different regions in the scene to be shot exhibit differentiated distribution. Compared with another part of the scene to be shot, a refocusing accuracy of a light field image section that corresponds to the first region of the scene to be shot varies from a default refocusing accuracy. An actual refocusing accuracy of a light field image section that corresponds to the first region is close or equal to the object refocusing accuracy as far as possible, so as to achieve differentiated distribution of refocusing accuracies of various light field image sections that correspond to different regions of the scene to be shot, thereby better satisfying a user's actual application demands.

There is no limit to the manners in which the apparatus for controlling light field capture is embodied. For example, the apparatus for controlling light field capture may be an independent component, the component cooperating with a light field camera in communications; or the apparatus for controlling light field capture may be integrated as a functional module into an image capture device comprising a light field camera, which is not limited in this embodiment of the present application.

Figure 5:
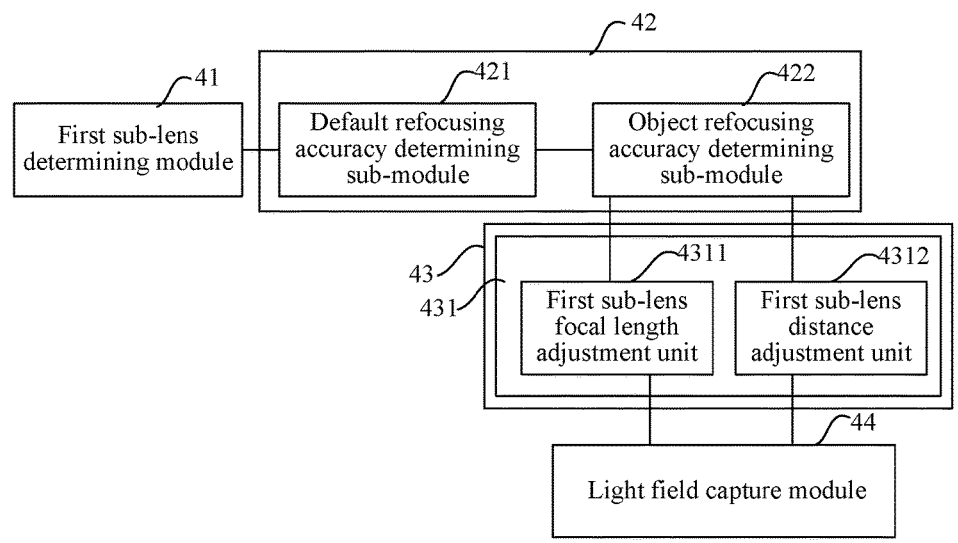
FIG. 5 is a logic block diagram of a second apparatus for controlling light field capture according to an embodiment of the present application.

Optionally, as shown in FIG. 5, the object refocusing accuracy determining module 42 comprises: a default refocusing accuracy determining sub-module 421 and an object refocusing accuracy determining sub-module 422. The default refocusing accuracy determining sub-module 421 is configured to determine a default refocusing accuracy of a light field image section captured by the first sub-lens; and the object refocusing accuracy sub-module 422 is configured to determine, according to the default refocusing accuracy, an object refocusing accuracy, wherein the object refocusing accuracy is greater than the default refocusing accuracy. In this solution, a light field capture parameter of the first sub-lens is adjusted according to the object refocusing accuracy, to cause a refocusing accuracy of a light field image section captured by the first sub-lens to be greater than a refocusing accuracy of a light field image section captured by another sub-lens of an image sensor.

Optionally, as shown in FIG. 5, the first sub-lens adjustment module 43 comprises a first sub-lens adjustment sub-module 431. The first sub-lens adjustment sub-module 431 is configured to adjust, according to the object refocusing accuracy, a focal length of the first sub-lens and/or a distance between the first sub-lens and the image sensor. Through the solution, depth ranges of refocusing point adjustment of the light field camera before and after being adjusted basically remain the same, which facilitates improving quality of a refocused image that is captured based on a light field image of the scene to be shot, under a circumstance that refocusing accuracies of different light field image sections captured by different sub-lenses are different.

Optionally, the first sub-lens adjustment sub-module 431 comprises a first sub-lens focal length adjustment unit 4311. The first sub-lens focal length adjustment unit 4311 is configured to reduce, according to the object refocusing accuracy, a focal length of the first sub-lens. In the solution, a refocusing accuracy of a light field image section captured after a focal length of the first sub-lens is adjusted, is close or equal to the object refocusing accuracy as far as possible.

Optionally, the first sub-lens adjustment sub-module 431 comprises a first sub-lens distance adjustment unit 4312. The first sub-lens distance adjustment unit 4312 is configured to reduce, according to the object refocusing accuracy, a distance between the first sub-lens and an image sensor. In the solution, a refocusing accuracy of a light field image section captured after a distance between the first sub-lens and the image sensor is adjusted, is close or equal to the object refocusing accuracy as far as possible.

Figure 6:
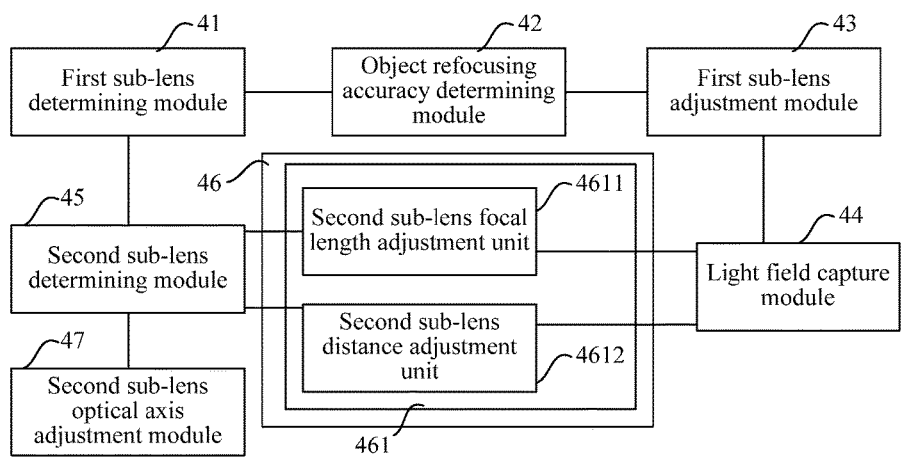
FIG. 6 is a logic block diagram of a third apparatus for controlling light field capture according to an embodiment of the present application.

Optionally, as shown in FIG. 6, the apparatus for controlling light field capture further comprises: a second sub-lens determining module 45 and a second sub-lens adjustment module 46. The second sub-lens determining module 45 is configured to determine at least one second sub-lens to be adjusted, the second sub-lens being a sub-lens other than the at least one sub-lens in the sub-lens array; and the second sub-lens adjustment module 46 is configured to adopt an adjustment manner that is reverse to a light field capture parameter of the first sub-lens, to adjust a light field capture parameter of the second sub-lens. The solution can achieve, by making full use of existing pixels of an image sensor, differentiated adjustment of refocusing accuracies of various light field image sections that are captured by different sub-lenses.

Optionally, the second sub-lens adjustment module 46 comprises a second sub-lens adjustment sub-module 461. The second sub-lens adjustment sub-module 461 is configured to adopt an adjustment manner that is reverse to a light field capture parameter of the first sub-lens, to adjust a focal length of the second sub-lens and/or a distance between the second sub-lens and the image sensor. In the solution, during adjustment of the second sub-lens, a depth range of refocusing point adjustment of the light field camera may remain the same as far as possible, and a probability of superimposing of imaging zones of adjacent sub-lenses is reduced.

Optionally, the second sub-lens adjustment sub-module 461 comprises a second sub-lens focal length adjustment unit 4611. The second sub-lens focal length adjustment unit 4611 is configured to increase, when a focal length of the first sub-lens is reduced, a focal length of the second sub-lens. In the solution, a probability of superimposing of imaging zones of adjacent sub-lenses is reduced by means of adjusting focal lengths of the first sub-lens and the second sub-lens, thereby improving overall quality of a light field image that is captured based on a light field camera after being adjusted.

Optionally, the second sub-lens adjustment sub-module 461 comprises a second sub-lens distance adjustment unit 4612. The second sub-lens distance adjustment unit 4612 is configured to reduce, when a distance between the first sub-lens and the image sensor is increased, a distance between the second sub-lens and the image sensor. In the solution, a probability of superimposing of imaging zones of adjacent sub-lenses is reduced by means of adjusting a distance from the first sub-lens to the image sensor and a distance from the second sub-lens to the image sensor, thereby improving overall quality of a light field image that is captured based on a light field camera after being adjusted.

Optionally, the apparatus for controlling light field capture further comprises a second sub-lens optical axis adjustment module 47. The second sub-lens optical axis adjustment module 47 is configured to adjust the direction of an optical axis of the second sub-lens, so as to move a center of an imaging region that corresponds to the second sub-lens on the image sensor, thereby reducing a distance between imaging zones that respectively correspond to the adjusted second sub-lens and an adjacent sub-lens thereof.

Figure 7:
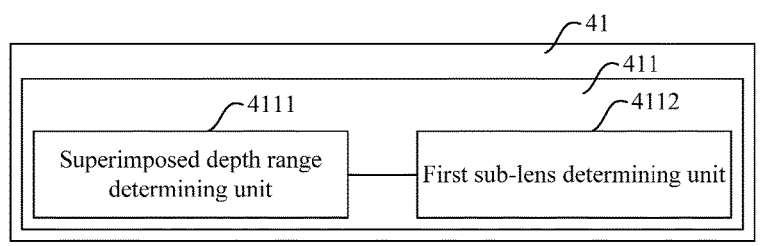
FIG. 7 is an optional logic block diagram of a first sub-lens according to an embodiment of the present application.

Optionally, as shown in FIG. 7, the first sub-lens determining module 41 comprises a first sub-lens adjustment sub-module 411. The first sub-lens determining sub-module 411 is configured to determine, according to the at least one sub-lens, a depth range of refocusing point adjustment of a light field image that the light field camera is allowed to acquire, and depth information of the first region, the at least one first sub-lens. In the solution, the accuracy of the first sub-lens determining is improved.

Optionally, the first sub-lens determining sub-module 411 comprises a superimposed depth range determining unit 4111 and a first sub-lens determining unit 4112. The superimposed depth range determining unit 4111 is configured to determine a superimposed depth range between depth information of the first region and the depth range of refocusing point adjustment; and the first sub-lens determining unit 4112 is configured to determine one or more sub-lenses that affect imaging within the superimposed depth range in the at least one sub-lens, as the at least one first sub-lens. In the solution, a sub-lens that affects light field capture of a part of the first region within the depth range of refocusing point adjustment may be adjusted, so as to improve a refocusing accuracy of a light field capture image section that corresponds to the first region.

Figure 8:
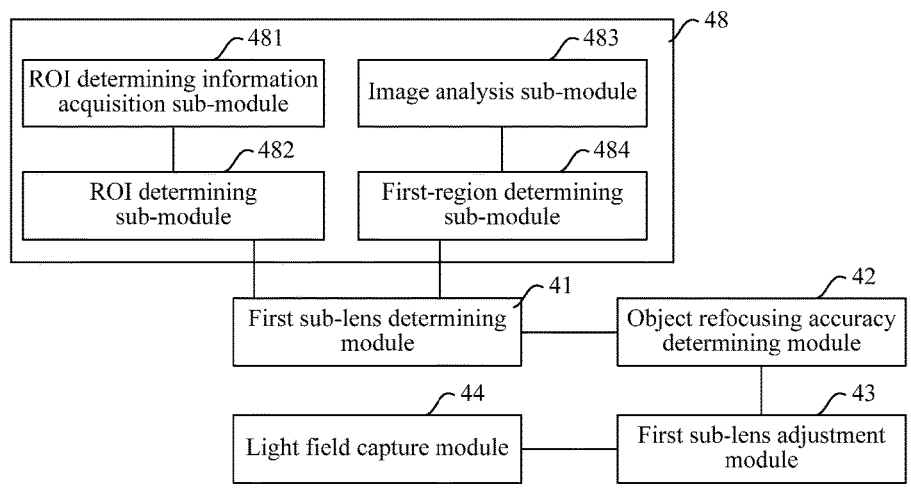
FIG. 8 is a logic block diagram of a fourth apparatus for controlling light field capture according to an embodiment of the present application.

Optionally, as shown in FIG. 8, the apparatus for controlling light field capture further comprises a first-region determining module 48. The first-region determining module 48 is configured to determine a first region. In the solution, a part of a current scene to be shot may be determined in advance according to actual demands as the first region, thereby better satisfying personalized application demands of a subject such as a user or a device.

In an alternative implementation manner, the first-region determining module 48 comprises an ROI determining information acquisition sub-module 481 and an ROI determining sub-module 482. The ROI determining information acquisition sub-module 481 is configured to acquire ROI determining information based on a preview image of the scene to be shot by the light field camera; and the ROI determining sub-module 482 is configured to determine a region that corresponds to the ROI determining information in the scene to be shot as the first region. In the solution, determining of the first region is more consistent with a user's actual demands, thereby better satisfying a user's personalized application demands.

In another alternative implementation manner, the first-region determining module 48 comprises an image analysis sub-module 483 and a first-region determining sub-module 484. The image analysis sub-module 483 is configured to perform an image analysis on a preview image of the scene to be shot by the light field camera; and the first-region determining sub-module 484 is configured to determine the first region according to a result of the image analysis. In the solution, determining of the first region is more intelligent, thereby improving efficiency and universality of the first region determining.

Figure 9:
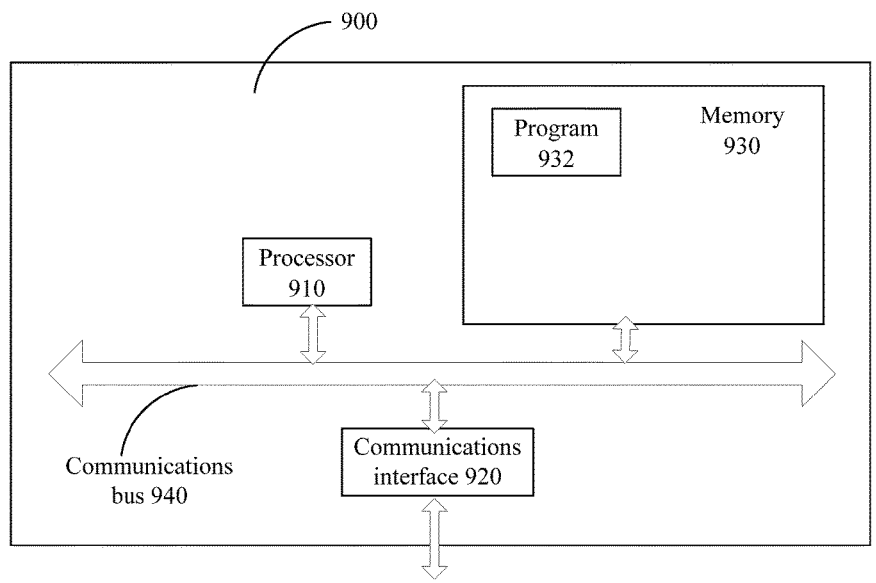
FIG. 9 is a logic block diagram of a fifth apparatus for controlling light field capture according to an embodiment of the present application.

FIG. 9 is a structural block diagram of still another apparatus for controlling light field capture provided by an embodiment of the present application. The specific implementation manner of the apparatus 900 for controlling light field capture is not limited in specific embodiments of the present application. As shown in FIG. 9, the apparatus 900 for controlling light field capture may comprise:

a processor 910, a communications interface 920, a memory 930, and a communications bus 940, wherein:

the processor 910, the communications interface 920, and the memory 930 communicate with each other by using the communications bus 940;

the communications interface 920 is configured to communication with, for example, a device having a function of communications, and an external optical source; and the processor 910 is configured to execute a program 932, and specifically, can perform relevant steps in any one of the foregoing embodiments of a method for controlling light field capture.

For example, the program 932 may comprise program code, wherein the program code comprises a computer operation instruction.

The processor 910 may be a central processing unit (CPU for short), an application specific integrated circuit (ASIC for short), or one or more integrated circuits configured to implement the embodiments of the present application.

The memory 930 is configured to store the program 932. The memory 930 may comprise a random access memory (RAM for short), and may also comprise a non-volatile memory, for example, at least one magnetic disk memory.

For example, in an alternative implementation manner, the processor 910 can perform, by executing the program 932, the following steps: determining, at least according to at least one sub-lens that affects imaging of a first region in a sub-lens array of a light field camera, at least one first sub-lens to be adjusted, the first region being a part of a scene to be shot; determining an object refocusing accuracy of a light field image section captured by the first sub-lens in a light field image of the scene to be shot; adjusting, according to the object refocusing accuracy, a light field capture parameter of the first sub-lens; and performing, based on the light field camera after being adjusted, light field capture on the scene to be shot.

In another alternative implementation manner, the processor 910 can also perform by executing the program 932, steps mentioned in any other one of the foregoing embodiments, and the details are not described herein again.

For specific implementation of steps of the program 932, refer to the description of corresponding steps, modules, sub-modules and units in the foregoing embodiments. The details are not described herein again. A person skilled in the art may clearly understand that, for the specific operation procedure of the above devices and modules, the description of corresponding procedures in the foregoing method embodiments may be referred to for the purpose of convenient and brief description. The details are not described herein again.

In the foregoing embodiments of the present application, the serial number and/or sequence of the embodiments are only used for the convenience of description, and do not represent inferiority or superiority of the embodiments. The description of each embodiment has different focus. For any part of an embodiment not described in details, refer to relevant description of another embodiment. For relevant description of the implementation principle or process of apparatus, device or system embodiments, refer to records of relevant method embodiments, and the details are not described herein again.

A person of ordinary skill in the art may recognize that, the units, methods and procedures of each example described with reference to the embodiments disclosed herein, can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or a part thereof contributing to the existing art, or a part of the technical solutions may be implemented in the form of a software product. The computer software product is stored in a storage medium and comprises several instructions for instructing a computer device (which may be a personal computer, a server, a network device, or the like) to perform all or some of the steps of the methods in the embodiments of the present application. The foregoing storage medium comprises: any medium that can store program code, such as a USB flash drive, a removable hard disk, a read-only memory (ROM for short), a random access memory (RAM for short), a magnetic disk, or an optical disc.

In the apparatus, method and system embodiments of the present application, apparently, each component (such as a system, a sub-system, a module, a sub-module, a unit, and a sub-unit) or each step may be decomposed, combined and/or recombined after decomposition. Such decomposition and/or recombination shall be considered as an equivalent solution of the present application. In addition, in the above description of specific embodiments of the present application, a feature described and/or shown in one implementation manner may be used in one or more other implementation manners in a same or similar manner, combined with a feature of another implementation manner, or replace a feature of another implementation manner.

It should be emphasized that, the term "comprise" used herein refers to existence of a feature, an element, a step or a component, but does not exclude existence or addition of one or more other features, elements, steps or components.

Finally, it should be noted that, the above implementation manners are only used to describe the present application, rather than limit the present application. Various alterations and variants may also be made by a person of ordinary skill in the art without departing from the spirit and scope of the present application. Therefore, all equivalent technical solutions also belong to the scope of the present application, and the patent protection scope of the present application should be subject to the claims.

What is claimed is:

1. A method for controlling light field capture, comprising:
   determining, according to at least one sub-lens that affects imaging of a first region in a sub-lens array of a light field camera, at least one first sub-lens to be adjusted, the first region being a part of a scene to be shot;
   determining an object refocusing accuracy of a light field image section captured by the first sub-lens in a light field image of the scene to be shot;
   adjusting, according to the object refocusing accuracy, a light field capture parameter of the first sub-lens; and
   performing, based on the light field camera after being adjusted, light field capture on the scene to be shot.

2. The method for controlling light field capture of claim 1, wherein the determining an object refocusing accuracy comprises:
   determining a default refocusing accuracy of the light field image section captured by the first sub-lens; and
   determining, according to the default refocusing accuracy, the object refocusing accuracy, wherein the object refocusing accuracy is greater than the default refocusing accuracy.

3. The method for controlling light field capture of claim 1, wherein the light field capture parameter of the first sub-lens comprises at least one of the following: a focal length of the first sub-lens, and a distance between the first sub-lens and the image sensor.

4. The method for controlling light field capture of claim 3, wherein the adjusting, according to the object refocusing accuracy, a focal length of the first sub-lens comprises:
   reducing, according to the object refocusing accuracy, a focal length of the first sub-lens.

5. The method for controlling light field capture of claim 3, wherein the adjusting, according to the object refocusing accuracy, a distance between the first sub-lens and the image sensor comprises:
   increasing, according to the object refocusing accuracy, a distance between the first sub-lens and the image sensor.

6. The method for controlling light field capture of claim 1, wherein, before the performing, based on the light field camera after being adjusted, light field capture on the scene to be shot, the method further comprises:
   determining at least one second sub-lens to be adjusted, the second sub-lens being a sub-lens other than the at least one sub-lens in the sub-lens array; and
   adopting an adjustment manner that is reverse to a light field capture parameter of the first sub-lens; to adjust a light field capture parameter of the second sub-lens.

7. The method for controlling light field capture of claim 6, wherein the light field capture parameter of the second sub-lens comprises at least one of the following:
   a focal length of the second sub-lens; and a distance between the second sub-lens and the image sensor.

8. The method for controlling light field capture of claim 7, wherein the adopting an adjustment manner that is reverse to a light field capture parameter of the first sub-lens, to adjust a focal length of the second sub-lens, comprises:
   increasing, when a focal length of the first sub-lens is reduced, a focal length of the second sub-lens.

9. The method for controlling light field capture of claim 7, wherein the adopting an adjustment manner that is reverse to a light field capture parameter of the first sub-lens; to adjust a distance between the second sub-lens and the image sensor, comprises:
   reducing, when a distance between the first sub-lens and the image sensor is increased, a distance between the second sub-lens and the image sensor.

10. The method for controlling light field capture of claim 7, wherein, before the performing, based on the light field camera after being adjusted, light field capture on the scene to be shot, the method further comprises:
    adjusting the direction of an optical axis of the second sub-lens, so as to move a center of an imaging region that corresponds to the second sub-lens on the image sensor, thereby reducing a distance between imaging zones that respectively correspond to the adjusted second sub-lens and an adjacent sub-lens thereof.

11. The method for controlling light field capture of claim 1, wherein the determining at least one first sub-lens comprises:
    determining, according to the at least one sub-lens, a depth range of refocusing point adjustment of a light field image that the light field camera is allowed to capture, and depth information of the first region, the at least one first sub-lens.

12. The method for controlling light field capture of claim 11, wherein the determining, according to the at least one sub-lens, a depth range of refocusing point adjustment, and depth information of the first region, the at least one first sub-lens comprises:
    determining a superimposed depth range between the depth information of the first region and the depth range of refocusing point adjustment; and
    determining one or more sub-lenses that affect imaging within the superimposed depth range among the at least one sub-lens, as the at least one first sub-lens.

13. The method for controlling light field capture of claim 1, wherein the method further comprises: determining the first region.

14. The method for controlling light field capture of claim 13, wherein the determining the first region comprises:
    acquiring, based on a preview image of the scene to be shot by the light field camera, information on determining of a region of interest (ROI); and
    determining a region that corresponds to the ROI determining information in the scene to be shot as the first region.

15. The method for controlling light field capture of claim 13, wherein the determining the first region comprises:
    performing an image analysis on a preview image of the scene to be shot by the light field camera; and
    determining, according to a result of the image analysis, the first region.

16. An apparatus for controlling light field capture, comprising:
    a first sub-lens determining module, configured to determine, at least according to at least one sub-lens that affects imaging of a first region in a sub-lens array of a light field camera, at least one first sub-lens to be adjusted, the first region being a part of a scene to be shot;
    an object refocusing accuracy determining module, configured to determine an object refocusing accuracy of a light field image section captured by the first sub-lens in a light field image of the scene to be shot;

a first sub-lens adjustment nodule, configured to adjust, according to the object refocusing accuracy, a light field capture parameter of the first sub-lens; and a light field capture module, configured to perform, based on the light field camera after being adjusted, light field capture on the scene to be shot.

17. The apparatus for controlling light field capture of claim 16, wherein the object refocusing accuracy determining module comprises:

a default refocusing accuracy determining sub-module, configured to determine a default refocusing accuracy of the light field image section captured by the first sub-lens; and an object refocusing accuracy determining sub-module, configured to determine, according to the default refocusing accuracy, the object refocusing accuracy, wherein, the object refocusing accuracy is greater than the default refocusing accuracy.

18. The apparatus for controlling light field capture of claim 16 or 17, wherein the first sub-lens adjustment module comprises:

a first sub-lens adjustment sub-module, configured to adjust, according to the object refocusing accuracy, a focal length of the first sub-lens and/or a distance between the first sub-lens and the image sensor.

19. The apparatus for controlling light field capture of claim 18, wherein the first sub-lens adjustment sub-module comprises:

a first sub-lens focal length adjustment unit, configured to reduce, according to the object refocusing accuracy, a focal length of the first sub-lens.

20. The apparatus for controlling light field capture of claim 18, wherein the first sub-lens adjustment sub-module comprises:

a first sub-lens distance adjustment unit, configured to reduce, according to the object refocusing accuracy, a distance between the first sub-lens and the image sensor.

21. The apparatus for controlling light field capture of claim 16, wherein the apparatus further comprises:

a second sub-lens determining module, configured to determine at least one second sub-lens to be adjusted, the second sub-lens being a sub-lens other than the at least one sub-lens in the sub-lens array; and a second sub-lens adjustment module, configured to adopt an adjustment manner that is reverse to a light field capture parameter of the first sub-lens, to adjust a light field capture parameter of the second sub-lens.

22. The apparatus for controlling light field capture of claim 21, wherein the second sub-lens adjustment module comprises:

a second sub-lens adjustment sub-module; configured to adopt an adjustment manner that is reverse to a light field capture parameter of the first sub-lens, to adjust a focal length of the second sub-lens and/or a distance between the second sub-lens and the image sensor.

23. The apparatus for controlling light field capture of claim 22, wherein the second sub-lens adjustment sub-module comprises:

a second sub-lens focal length adjustment unit; configured to increase, when a focal length of the first sub-lens is reduced, a focal length of the second sub-lens.

24. The apparatus for controlling light field capture of claim 22, wherein the second sub-lens adjustment sub-module comprises:

a second sub-lens distance adjustment unit, configured to reduce, when a distance between the first sub-lens and the image sensor is increased, a distance between the second sub-lens and the image sensor.

25. The apparatus for controlling light field capture of claim 21, wherein the apparatus further comprises:

a second sub-lens optical axis adjustment module, configured to adjust the direction of an optical axis of the second sub-lens, so as to move a center of an imaging region that corresponds to the second sub-lens on the image sensor, thereby reducing a distance between imaging zones that respectively correspond to the adjusted second sub-lens and an adjacent sub-lens thereof.

26. The apparatus for controlling light field capture of claim 16, wherein the first sub-lens determining module comprises:

a first sub-lens determining sub-module, configured to determine, according to the at least one sub-lens, a depth range of refocusing point adjustment of a light field image that the light field camera is allowed to capture, and depth information of the first region, the at least one first sub-lens.

27. The apparatus for controlling light field capture of claim 26, wherein the first sub-lens determining sub-module comprises:

a superimposed depth range determining unit, configured to determine a superimposed depth range between depth information of the first region and the depth range of refocusing point adjustment; and a first sub-lens determining unit, configured to determine one or more sub-lenses that affect imaging within the superimposed depth range among the at least one sub-lens, as the at least one first sub-lens.

28. The apparatus for controlling light field capture of claim 16, wherein the apparatus further comprises:

a first-region determining module, configured to determine the first region.

29. The apparatus for controlling light field capture of claim 28, wherein the first-region determining module comprises:

an ROI determining information capture sub-module, configured to acquire, based on a preview image of the scene to be shot by the light field camera, ROI determining information; and an ROI determining sub-module, configured to determine a region that corresponds to the ROI determining information in the scene to be shot as the first region.

30. The apparatus for controlling light field capture of claim 28, wherein the first-region determining module comprises:

an image analysis sub-module, configured to perform an image analysis on a preview image of the scene to be shot by the light field camera; and a first-region determining sub-module, configured to determine, according to a result of the image analysis, the first region.

31. A computer readable storage apparatus, comprising at least one executable instruction, which, in response to execution, causes a processor to perform a method for controlling light field capture comprising:

determining, according to at least one sub-lens that affects imaging of a first region in a sub-lens array of a light field camera, at least one first sub-lens to be adjusted, the first region being a part of a scene to be shot;

determining an object refocusing accuracy of a light field image section captured by the first sub-lens in a light field image of the scene to be shot;

adjusting, according to the object refocusing accuracy; a light field capture parameter of the first sub-lens; and performing, based on the light field camera after being adjusted, light field capture on the scene to be shot.

32. An apparatus for controlling light field capture, characterized by comprising a processor and a memory, the memory storing computer executable instructions, the processor being connected to the memory through a communication bus, and when the apparatus for controlling task migration operates, the processor executing the computer executable instructions stored in the memory, so that the apparatus for controlling task migration executes operations, comprising:

determining, according to at least one sub-lens that affects imaging of a first region in a sub-lens array of a light field camera, at least one first sub-lens to be adjusted, the first region being a part of a scene to be shot;

determining an object refocusing accuracy of a light field image section captured by the first sub-lens in a light field image of the scene to be shot;

adjusting, according to the object refocusing accuracy; a light field capture parameter of the first sub-lens; and performing, based on the light field camera after being adjusted, light field capture on the scene to be shot.

* * * * *

UNITED STATES PATENT AND TRADEMARK OFFICE
CERTIFICATE OF CORRECTION

| | |
|---|---|
| PATENT NO. | : 10,257,502 B2 |
| APPLICATION NO. | : 15/520125 |
| DATED | : April 9, 2019 |
| INVENTOR(S) | : Lin Du and Liang Zhou |

Page 1 of 1

It is certified that error appears in the above-identified patent and that said Letters Patent is hereby corrected as shown below:

In the Claims

Claim 6, Column 19, Line 55:
"first sub-lens;" should read -- first sub-lens, --.

Claim 18, Column 21, Line 20:
"claim 16 or 17" should read -- claim 16 --.

Claim 22, Column 21, Line 53:
"a second sub-lens adjustment sub-module;" should read -- a second sub-lens adjustment sub-module, --.

Signed and Sealed this
Twenty-fourth Day of September, 2019

Andrei Iancu
*Director of the United States Patent and Trademark Office*